United States Patent [19]
Choi

[11] Patent Number: 5,745,304
[45] Date of Patent: Apr. 28, 1998

[54] INTEGRATED OPTICAL PICKUP SYSTEM CAPABLE OF READING OPTICAL DISKS OF DIFFERENT THICKNESS

[75] Inventor: Hwan-Moon Choi, Seoul, Rep. of Korea

[73] Assignee: Daewoo Electronics, Co., Ltd., Seoul, Rep. of Korea

[21] Appl. No.: 757,710

[22] Filed: Nov. 27, 1996

[30] Foreign Application Priority Data

Nov. 27, 1995 [KR] Rep. of Korea ............... 95-43819

[51] Int. Cl.[6] ........................................... G11B 7/00
[52] U.S. Cl. ............... 359/719; 369/44.12; 369/44.23
[58] Field of Search ............................ 359/719, 562, 359/558; 369/44.12, 112, 103, 107, 122, 44.23, 110, 44.21, 109, 100, 13; 385/16, 29, 28, 14, 131; 372/50, 102

[56] References Cited

U.S. PATENT DOCUMENTS

| | | | |
|---|---|---|---|
| 4,866,694 | 9/1989 | Korth | 369/110 |
| 4,945,525 | 7/1990 | Yamamoto et al. | 369/44.12 |
| 4,971,414 | 11/1990 | Funato et al. | 350/96.19 |
| 5,070,488 | 12/1991 | Fukushima et al. | 360/44.12 |
| 5,105,403 | 4/1992 | Kando et al. | 369/44 |
| 5,195,070 | 3/1993 | Shiba et al. | 369/44.12 |
| 5,200,939 | 4/1993 | Nishiwaki et al. | 369/44.12 |
| 5,208,800 | 5/1993 | Isobe et al. | 369/112 |
| 5,317,551 | 5/1994 | Shiono | 369/44.12 |
| 5,428,584 | 6/1995 | Yoshida et al. | 369/13 |
| 5,446,719 | 8/1995 | Yoshida et al. | 369/116 |
| 5,450,237 | 9/1995 | Yoshida et al. | 359/562 |
| 5,481,386 | 1/1996 | Shimano et al. | 369/44.12 |
| 5,583,843 | 12/1996 | Horinouchi | 369/103 |
| 5,621,715 | 4/1997 | Ohyama | 369/112 |

*Primary Examiner*—Frank G. Font
*Assistant Examiner*—Michael P. Stafira
*Attorney, Agent, or Firm*—Pennie & Edmonds LLP

[57] ABSTRACT

An integrated optical pickup system for reading information signals recorded on a recording surface of a selected optical disk, which is selected from both optical disks so as to be loaded on a disk tray, is comprised of a first glass substrate equipped with means for generating a first and a second focused light beams, letting one of the focused light beams impinge onto the recording surface of the selected optical disk and collimating the focused light beam reflected from the selected optical disk, wherein each of the focused light beams is focused onto the recording surface of a corresponding optical disk, respectively; and a second glass substrate, integrated therein with a detector capable of measuring the intensity of a light beam detected and a reflection layer, for reflecting a portion of the collimated light beam to the detecting lens, thereby allowing the integrated optical pickup system to read the information signals off the recording surface of the selected optical disk.

23 Claims, 3 Drawing Sheets

INTEGRATED OPTICAL PICKUP SYSTEM CAPABLE OF READING OPTICAL DISKS OF DIFFERENT THICKNESS

FIELD OF THE INVENTION

The present invention relates to an integrated optical pickup system; and, more particularly, to an improved integrated optical pickup system capable of reading optical disks of varying thicknesses.

DESCRIPTION OF THE PRIOR ART

As is well known, a short wavelength light source and a large numerical aperture(NA) are important optical factors in optical pickup heads for realizing a high density optical storage. Generally, a large NA lens, e.g., 0.6, has been preferably used with a thin optical disk having the thickness of, e.g., 0.6 mm; and, therefore, if an optical head for reading the thin optical disk is used to read a conventional 1.2 mm disk, there may occur a spherical aberration due to the disk thickness difference, which must be corrected.

Accordingly, dual focus optical head with a holographic optical element(HOE) has been introduced to solve the problem. In FIG. 1, there is shown the dual focus optical head 100 for reproducing information signals stored on a thin and a thick optical disks loaded on a disk tray alternately, wherein each of the optical disks has a corresponding recording surface, which is described in, e.g., Kanda and Hayashi, "Dual Focus Optical Head for 0.6 mm and 1.2 mm Disks", *SPIE Vol.* 2338 *Optical Data Storage* (1994)/283. The dual focus optical head 100 includes: a light source 126 for generating a light beam, a beam splitter 106, a collimate lens 108, a HOE 110, an objective lens 112, a cylindrical lens 104 and a detector 102 provided with four photoelectric cells, wherein the HOE 110 is designed as a concave lens in such a way that the focal length of a +1st order diffracted light beam 128 is longer than that of a 0th order diffracted light beam 124.

In the optical head 100, when a thin optical disk 116 is loaded on the disk tray, the 0th order diffracted light beam 124 transmitted from the HOE 110 is utilized for reproducing the information signal off a recording surface 118 of the thin optical disk 116. In this case, the light beam emitted from the light source 126, e.g., a laser diode, enters the HOE 110 via the beam splitter 106, which partially reflects the light beam incident on a surface incorporated therein and lets same partially pass therethrough, and the collimate lens 108 for making the light beam from the beam splitter 106 be parallel. In such a case, the HOE 110 simply plays the role of a parallel plate for the 0th order diffracted light beam 124 of the parallel light beam. The 0th order diffracted light beam 124 is focused onto the recording surface 118 of the thin optical disk 116 by the objective lens 112. When the 0th order diffracted light beam 124 is reflected from the thin optical disk 116 to the HOE 110 via the objective lens 112, the HOE 110 plays again the role of a parallel plate. The 0th order diffracted light beam 124, after passing through the collimate lens 108 and the beam splitter 106, becomes astigmatic by passing through the cylindrical lens 104, allowing the detector 102 to read the information signal off the recording surface 118 of the thin optical disk 116.

Meanwhile, in order to reproduce the information signal off a recording surface 120 of a thick optical disk 122, the +1st order diffracted light beam 128 transmitted from the HOE 110 is used. It should be noted that the functions and structures of the optical components except the HOE 110 for the +1st order diffracted light beam 128 in the optical head 100 is similar to those for the 0th order diffracted light beam 124. In this case, the HOE 110 in conjunction with the objective lens 112 functions as a lens for focussing the +1st order diffracted light beam 128 onto the recording surface 120 of the thick optical disk 122. Therefore, the optical head 100 for use with the thin optical disk 116 is capable of reproducing the information signal off the recording surface 120 of the thick optical disk 122.

There is a number of problems associated with the above-described optical head 100, however. The optical head 100 of the prior art requires numerous bulky discrete components, rendering the assembly and alignment thereof rather complex and costly, and also requires a cylindrical lens 104 for detecting a focusing error signal to thereby make the optical head 100 further complicated.

SUMMARY OF THE INVENTION

It is, therefore, a primary object of the present invention to provide an integrated optical pickup system of a reduced size with a simpler assembly and alignment thereof.

In accordance with the present invention, there is provided an integrated optical pickup system for reading information signals recorded on a recording surface of a selected optical disk, which is selected among N optical disks, N being a positive integer, wherein the distance between a recording surface of any of the N optical disks and the integrated optical pickup system is different from those of all the others, the optical pickup system comprising: a first optical guide for generating N converged light beams to impinge one of them onto the recording surface of the selected optical disk and collimating said one of the converged light beams after being reflected from the recording surface of the selected optical disk, wherein each of the N converged light beams is capable of being focused on a recording surface of a corresponding optical disk, respectively; and a second optical guide, provided with a detector capable of measuring the intensity of a light beam detected and an optical device for guiding and focusing the collimated light beam onto the detector, thereby reading the information signals off the recording surface of the selected optical disk.

BRIEF DESCRIPTION OF THE DRAWINGS

The present invention together with the above and other objects and advantages will become apparent from the following description of preferred embodiments, given in conjunction with the accompanying drawings, wherein.

DETAILED DESCRIPTION OF THE PREFERRED EMBODIMENTS

Figure 1:
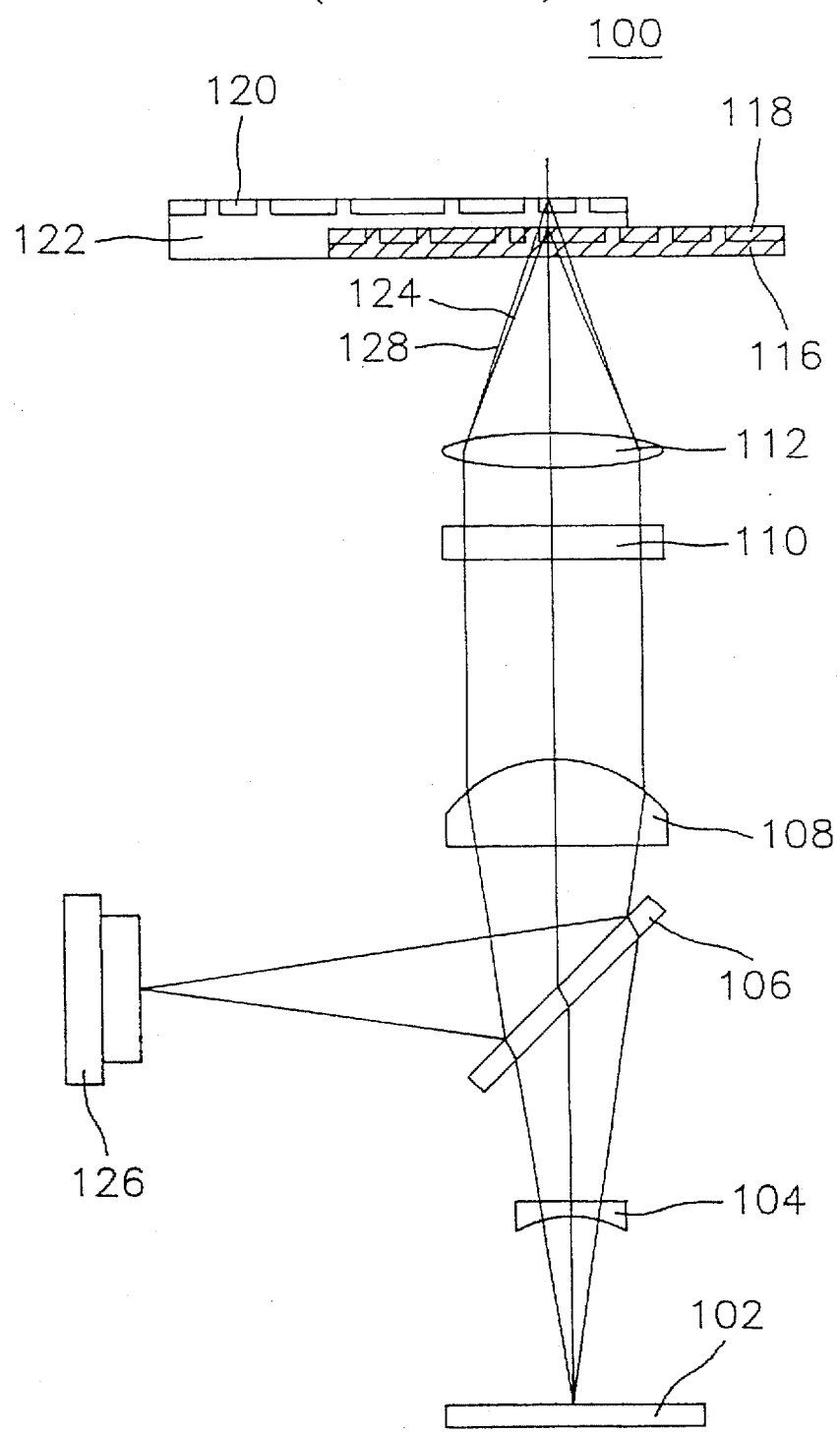
FIG. 1 represents a schematic side view of a prior art optical pickup system.
Figure 2:
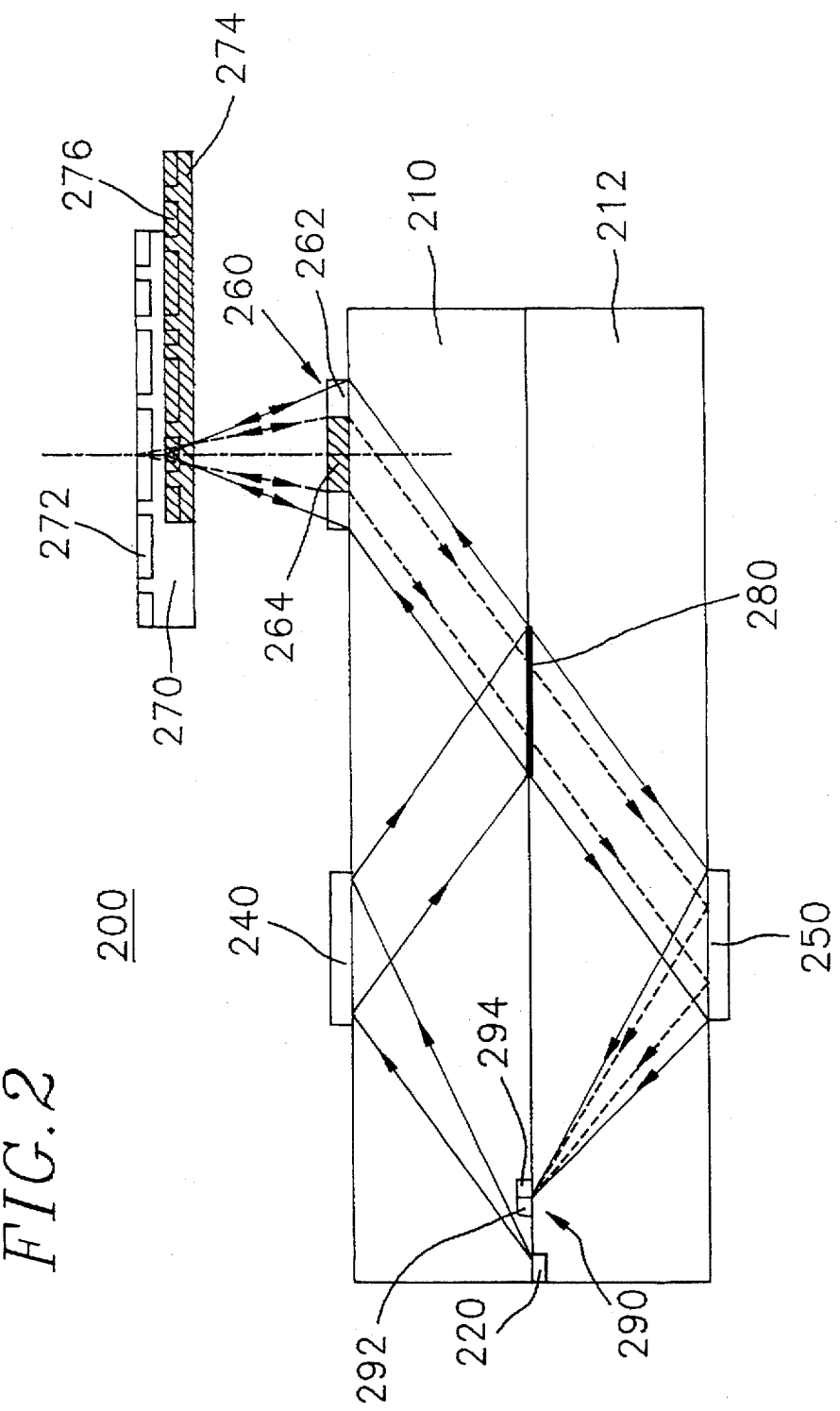
FIG. 2 depicts a schematic cross-sectional view of an integrated optical pickup system in accordance with the present invention.

There is illustrated in FIG. 2, an integrated optical pickup system 200 which includes a first and a second glass substrates 210, 212, each of the glass substrates having a top and a bottom surfaces, a semiconductor laser 220 for generating a light beam, a reflection collimating lens 240, a reflection layer 280, an optical device 260 provided with a first and a second parts 262, 264, a detecting lens 250 and a photo detector 290 provided with a pair of reception surfaces 292, 294, wherein the bottom surface of the first glass substrate 210 is coupled with the top surface of the second glass substrate 212. The semiconductor laser 220 is attached to the bottom surface of the first glass substrate 210 and the reflection layer 280 is formed on the bottom surface of the first glass substrate 210 at a predetermined distance away from the semiconductor laser 220, wherein the reflection layer 280 is made of light reflecting material, e.g., Ag. The reflection collimating lens 240 and the optical device 260 are integrated on the top surface of the first glass substrate 210 in a facing relationship with the reflection layer 280 by using a conventional electron-beam writing system with a curve pattern generator.

In the system 200, the light beam emitted from the semiconductor laser 220 impinges onto the reflection collimating lens 240 which is in a facing relationship with the semiconductor laser 220 and collimates the light beam into a parallel light beam to thereby obtain a collimated light beam. The collimated light beam is reflected to the optical device 260 by the reflection layer 280 which is capable of reflecting a portion of the collimated light beam, wherein the reflected portion of the light beam, after being reflected from one of recording surfaces 272, 276, will be transmitted through the optical device 260.

Figure 3:
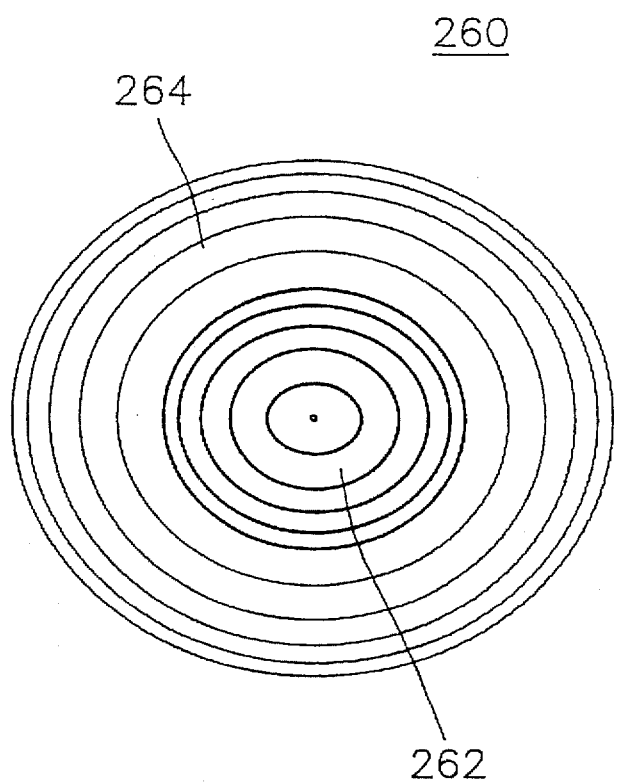
FIG. 3 shows a plan view of an optical device in accordance with the present invention.

Referring to FIG. 3, there is shown a plan view of the optical device 260 with a first and a second parts 262, 264, which is integrated on the first glass substrate 210. Each part of the optical device 260 has a number of gratings, wherein each of the gratings is in an elliptic shape to thereby convert the collimated light beam incident to the optical device 260 with an oblique angle θ thereto into a light beam converging with an optical axis formed by a center point of the optical device 260 and the focal point in the first recording surface 276 of the thin optical disk 274, wherein the optical axis is represented by a phantom line in FIG. 2. The elliptic shape is designed that its grating period, groove depth or grating shape has an asymmetric to convert a collimated light beam with an oblique angle θ into a light beam converging with the optical axis. The optimum groove depth and grating period of the first part 262 is different from those of the second part 264 and thus, each of the parts 262, 264 has a different focal length. Therefore, optical disks 270, 274 are adjusted to be positioned in such a manner that the second part 264 of the optical device 260 focuses the collimated light beam impinging thereon on the second recording surface 272 of the thick optical disk 270 and the first part 262 of the optical device 260 focuses the collimated light beam impinging thereon on the first recording surface 276 of the thin optical disk 274.

When the thin optical disk 274 having the first recording surface 276 and a thickness of, e.g., 0.6 mm, is loaded on the disk tray, the light passing through the first part 262 of the optical device 260 is utilized for reproducing the information signal off the first recording surface 276 of the thin optical disk 274, wherein the optical device 260 is in a facing relationship with the first recording surface 276 of the thin optical disk 274.

Referring back to FIG. 2, the collimated light beam passing through the optical device 260 is divided into a first and a second converged light beams transmitted through the first and the second parts 262, 264 of the optical device 260, respectively. The first and the second converged light beams are represented by a solid and a dot lines, respectively, in FIG. 2. When the first converged light beam is focused on the first recording surface 276 of the thin optical disk 274, the second converged light beam will not be focused thereon due to the difference in the focal length between the two parts 262, 264 of the optical device 260. The first converged light beam reflected from the first recording surface 276 is transmitted through the first part 262 of the optical device 260 to thereby obtain a first collimated light beam. The first collimated light beam impinges onto the detecting lens 250 passing by the reflection layer 280. The detecting lens 250 is integrated on the bottom surface of the second glass substrate 212 in a facing relationship with the reflection layer 280 and the photo detector 290. The detecting lens 250 is made to serve as a cylindrical lens, thereby utilizing an astigmatic method for reading the information signal, e.g., a focusing error signal, from the first and the second recording surfaces 276, 272. The detecting lens 250 converges the first collimated light beam on the reception surfaces 292, 294 of the photo detector 290, wherein the second converged light beam detected is not focused on the reception surfaces 292, 294 of the photo detector 290, because the first recording surface 276 from which the second converged light beam was reflected is closer to the first part 262 than its focal distance. The reception surfaces 292, 294 of the photo detector 290 are capable of measuring the intensity of the light beam detected.

Alternatively, when the thick optical disk 270 having the second recording surface 272 and a thickness of, e.g., 1.2 mm, is loaded on the disk tray, the light passing through the second part 264 of the optical device 260 is utilized for reproducing the information signal off the second recording surface 272 of the thick optical disk 270. The light beam passing through the optical device 260 is also divided into a first and a second converged light beams transmitted through the first and the second parts 262, 264 of the optical device 260, respectively.

In this case, the second converged light beam is focused on the second recording surface 272 of the thick optical disk 270, but the first converged light beam will not be focused thereon due to the difference in the focal length between the parts 262, 264 of the optical device 260. The second converged light beam reflected from the second recording surface 272 is transmitted through the second part 264 of the optical device 260 to thereby obtaining a second collimated light beam. The second collimated light beam impinges onto the detecting lens 250 passing by the reflection layer 280. The detecting lens 250 converges the second collimated light beam on the reception surfaces 292, 294 of the photo detector 290, wherein the first converged light beam detected on the reception surfaces 292, 294 of the detector 290 is not focused thereon, because the second recording surface 272 from which the first converged light beam is reflected is farther away from the second part 264 than its focal distance. The intensity distributions of the second converged light beam detected at the detector 290 vary in response to the displacement of the thick optical disk 270 from the optical device 260. The detector 290 detects the light intensity distributions of the second converged light beam via the reflection layer 280 and the detecting lens 250, thereby allowing the detector 290 to read an information signal, e.g., a focusing signal or a regeneration information signal, from the second recording surface 272 of the thick optical disk 270.

In comparison with the prior art integrated optical pickup system 100, the inventive integrated optical pickup system 200 can be used for selectively reading information signals from both of the thin and thick optical disk. This is achieved by integrating an optical device 260 on a first glass substrate 210, thereby allowing the integrated optical pickup system 200 to read the information signal.

While the present invention has been described with respect to the preferred embodiments, other modifications and variations may be made without departing from the spirit and scope of the present invention as set forth in the following claims.

What is claimed is:

1. An integrated optical pickup system for reading information signals recorded on a recording surface of a selected optical disk, which is selected from among a plurality of optical disks, wherein a distance between a recording surface of each of the optical disks and the integrated optical pickup system is different from each other, the optical pickup system comprising:

a first optical means for generating a same number of converged light beams as optical disks to have one of said converged light beams impinge onto the recording surface of the selected optical disk and collimating said one of the converged light beams after being reflected from the recording surface of the selected optical disk, each of said converged light beams being able to be focused on a recording surface of a corresponding optical disk; and a second optical means, provided with a detector capable of measuring the intensity of a light beam detected and an optical device for guiding and focusing the collimated light beam onto the detector, to thereby read the information signals off the recording surface of the selected optical disk.

2. The integrated optical pickup system of claim 1, wherein the first optical means includes:

a semiconductor laser for generating a light beam;

a first optical coupler for collimating the light beam;

a second optical coupler for dividing the collimated light beam into a same number of portions as optical disks and converging each of said portions of the collimated light beam onto a different focal position, wherein each focal position corresponds to the position of the recording surface of each corresponding optical disk, thereby generating said converged light beams.

3. The integrated optical pickup system of claim 2, wherein the first optical means further includes a reflection layer for partially reflecting a portion of the light beam collimated by the first optical coupler to the second optical coupler.

4. The integrated optical pickup system of claim 3, wherein the second optical coupler in the first optical means transmits the collimated light beam after being reflected from the recording surface to the optical device in the second optical means.

5. The integrated optical pickup system of claim 4, wherein the detector has a first and a second reception surfaces.

6. The integrated optical pickup system of claim 5, wherein each of the reception surfaces is capable of measuring the intensity of a light beam detected.

7. The integrated optical pickup system of claim 6, wherein the detector is placed at a focal point of the optical device.

8. An integrated optical pickup system for reading information signals recorded on a recording surface of a selected optical disk, which is selected among N optical disks, N being a positive integer, wherein the distance between a recording surface of each of the N optical disks and the integrated optical pickup system is different from each other, the optical pickup system comprising:

a first optical means for generating N converged light beams to have one of them impinge onto the recording surface of the selected optical disk and collimating said one of the converged light beams after being reflected from the recording surface of the selected optical disk, each of the N converged light beams being able to be focused on a recording surface of a corresponding optical disk, respectively, wherein the first optical means includes:

a semiconductor laser for generating a light beam:

a first optical coupler for collimating the light beam;

a second optical coupler for dividing the collimated light beam into N portions and converging each of said N portions of the collimated light beam on N different focal positions, wherein each focal position corresponds to the position of the recording surface of each corresponding optical disk, thereby generating said N converged light beams; and a reflection layer for partially reflecting a portion of the light beam collimated by the first optical coupler to the second optical coupler, wherein the collimated light beam is inclined at a predetermined angle with respect to an optical axis formed by a center point of the second optical coupler and the convergence point in the selected optical disk; and a second optical means, provided with a detector capable of measuring the intensity of a light beam detected and an optical device for guiding and focusing the collimated light beam onto the detector, to thereby read the information signals off the recording surface of the selected optical disk.

9. The integrated optical pickup system of claim 7, wherein said number N is 2.

10. An integrated optical pickup system for reading information signals recorded on a recording surface of a selected optical disk, which is selected among N optical disks, N being a positive integer, wherein the distance between a recording surface of each of the N optical disks and the integrated optical pickup system is different from each others, the optical pickup system comprising:

a first glass substrate, having a top and a bottom surfaces, equipped with means for generating N conversed light beams to have one of them impinge onto the recording surface of the selected optical disk and collimating said one of the converged light beams after being reflected from the recording surface of the selected optical disk, the top surface of the first glass substrate being in a facing relation with the optical disk, wherein the first glass substrate includes:

a semiconductor laser for generating a light beam, wherein the semiconductor laser is attached to a predetermined position on the bottom surface of the first glass substrate;

a reflection layer for reflecting a portion of the light beam, wherein the reflection layer is formed on the bottom surface of the first glass substrate at a predetermined distance from the semiconductor laser;

a reflection lens, integrated onto the top surface of the first glass substrate, for collimating the light beam and guiding it to the reflection layer; and an optical device for converging the collimated light beam into N converged light beams on N different focal positions, wherein each focal position corresponds to the position of the recording surface of each corresponding optical disk and the optical device is integrated onto the top surface of the first glass substrate in a facing relation with the recording surface of the selected optical disk to thereby generate the converged light beam;

a second glass substrate, having a top and a bottom surfaces provided with a detecting lens, wherein the detecting lens is integrated onto the bottom surface of the second glass substrate and the bottom surface of the first glass substrate is coupled with the top surface of the second glass substrate; and a detector provided with a first and a second reception surfaces for reading the information signals off the recording surface of the selected optical disk.

11. The integrated optical pickup system of claim 10, wherein the detecting lens is in a facing relationship with the detector and the reflection layer, respectively.

12. The integrated optical pickup system of claim 11, wherein said number N is 2.

13. The integrated optical pickup system of claim 12, wherein the optical device has a first and a second parts, wherein the first and the second parts are in the shapes of ellipse and annular ellipse, respectively.

14. The integrated optical pickup system of claim 13, wherein each part of the optical device has a number of gratings, to thereby convert a collimated light beam propagating with an oblique angle into a light beam converging with an optical axis formed by a center point of the optical device and the convergence point on the recording surface of the selected optical disk.

15. The integrated optical pickup system of claim 14, wherein optimum grating groove depth and grating period of the first part has different from those of the second part so that each of the parts have a different focal length.

16. The integrated optical pickup system of claim 15, wherein the reflection layer is made of silver.

17. The integrated optical pickup system of claim 11, wherein the detector is placed at a focal point of the detecting lens.

18. An integrated optical pickup system for reading information signals recorded on a recording surface of a selected optical disk, which is selected among N optical disks, N being a positive integer, wherein the distance between a recording surface of each of the N optical disks and the integrated optical pickup system is different from each others, the optical pickup system comprising:

a first optical means for generating N converged light beams to have one of them impinge onto the recording surface of the selected optical disk and collimating said one of the converged light beams after being reflected from the recording surface of the selected optical disk, wherein the first optical means includes:

a semiconductor laser for generating a light beam;

a first optical coupler for collimating the light beam; and a second optical coupler for dividing the collimated light beam into N portions and converging each of said N portions of the collimated light beam on N different focal positions, wherein each focal position corresponds to the position of the recording surface of each corresponding optical disk, thereby generating said N converged light beams, wherein each of the N converged light beams can be focused on a recording surface of a corresponding optical disk, respectively, and the collimated light beam is inclined at a predetermined angle with respect to an optical axis formed by a center point of the second optical coupler and the convergence point in the selected optical disk; and a second optical means, provided with a detector capable of measuring the intensity of a light beam detected and an optical device for guiding and focusing the collimated light beam onto the detector, to thereby read the information signals off the recording surface of the selected optical disk.

19. The integrated optical pickup system of claim 18, wherein the second optical coupler in the first optical means transmits the collimated light beam after being reflected from the recording surface to the optical device in the second optical means.

20. The integrated optical pickup system of claim 19, wherein the detector has a first and a second reception surfaces.

21. The integrated optical pickup system of claim 20, wherein each of the reception surfaces is capable of measuring the intensity of a light beam detected.

22. The integrated optical pickup system of claim 21, wherein the detector is placed at a focal point of the optical device.

23. An integrated optical pickup system for reading information signals recorded on a recording surface of one of a plurality of optical disks, wherein the distance between a recording surface of each of the optical disks and the integrated optical pickup system is different for each optical disk, the optical pickup system comprising:

a first substrate having a top surface and a bottom surface;

a second substrate having a top surface and a bottom surface, said top surface of said second substrate being coupled said bottom surface of said first substrate;

a laser for generating a beam of light in the first substrate;

a first lens positioned to reflect, within the first substrate, said beam of light in a direction away from said laser;

a reflection layer positioned to reflect, within the first substrate, the beam reflected by the first lens in a direction away from said first lens and said laser;

an optical device having a plurality of gratings, each grating having a different focal length, said optical device positioned such that the beam reflected by said reflection layer is divided by said plurality of gratings into a corresponding plurality of converged light beams, one of said plurality of converged light beams being focused onto a recording surface of a selected optical disk and then reflected back through its corresponding grating such that a collimated beam directed back towards said reflection layer is produced, said collimated beam passing through a thickness of said first substrate and entering the second substrate;

a second lens attached to the bottom surface of the second substrate, said second lens arranged to reflect the collimated light beam in a direction towards said laser; and a detector arranged to detect said collimated light beam.

* * * * *